United States Patent
Yamane

(10) Patent No.: US 8,060,850 B2
(45) Date of Patent: Nov. 15, 2011

(54) METHOD FOR DESIGNING SEMICONDUCTOR INTEGRATED CIRCUIT

(75) Inventor: Fumiyuki Yamane, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 431 days.

(21) Appl. No.: 12/408,142

(22) Filed: Mar. 20, 2009

(65) Prior Publication Data

US 2009/0265676 A1 Oct. 22, 2009

(30) Foreign Application Priority Data

Apr. 22, 2008 (JP) ................................. 2008-111774

(51) Int. Cl.
*G06F 17/50* (2006.01)
*G06F 9/455* (2006.01)

(52) U.S. Cl. ........ 716/133; 716/110; 716/113; 716/118; 716/119; 716/132; 716/134; 703/19

(58) Field of Classification Search .................. 716/110, 716/113, 118, 119, 132, 133, 134; 703/19
See application file for complete search history.

(56) References Cited

U.S. PATENT DOCUMENTS

| | | | | |
|---|---|---|---|---|
| 6,523,154 B2 * | 2/2003 | Cohn et al. | ..................... | 716/112 |
| 6,938,233 B2 * | 8/2005 | Satoh et al. | ..................... | 716/113 |
| 7,480,875 B2 * | 1/2009 | Satoh et al. | ..................... | 716/132 |
| 7,836,415 B2 * | 11/2010 | Ushiyama | ..................... | 716/136 |

FOREIGN PATENT DOCUMENTS

JP 2003-330986 11/2003

* cited by examiner

*Primary Examiner* — Suresh Memula
(74) *Attorney, Agent, or Firm* — Oblon, Spivak, McClelland, Maier & Neustadt, L.L.P.

(57) ABSTRACT

A method for designing a semiconductor integrated circuit, includes: disposing a plurality of cells in a cell layout region on the basis of a net list indicating connection relations of the plurality of cells to satisfy a setup timing condition; generating a plurality of power regions dividing the cell layout region into plurality; calculating a consumption current of each of the power regions by using a cell power file indicating a consumption current of each of the cells; adjusting layout positions of the temporarily disposed cells with reference to the consumption current of each of the power regions in a range that the setup timing condition is not violated; and optimizing hold timing of the cells after the position adjustment of the cells.

20 Claims, 9 Drawing Sheets

METHOD FOR DESIGNING SEMICONDUCTOR INTEGRATED CIRCUIT

CROSS-REFERENCE TO RELATED APPLICATIONS

This application is based upon and claims the benefit of priority from the prior Japanese Patent Application No. 2008-111774, filed on Apr. 22, 2008; the entire contents of which are incorporated herein by reference.

BACKGROUND OF THE INVENTION

This invention relates to a method for designing a semiconductor integrated circuit.

In a layout phase of laying out a net list generated by logically synthesizing, for example, HDL (hardware Description Language) description data in designing a semiconductor integrated circuit, optimization of timing is considered (for example, JP-A 2003-330986 (Kokai))

In the semiconductor integrated circuit, in recent years, the scale thereof has become large and the circuit has become fine, and furthermore, by lowering of the power voltage, IR drop (voltage lowering) has become large, and in the cell layout only considering timing, it is feared that the IR drop varies among the regions in the chip and that the maximum IR drop value becomes large. If the maximum value and the variation of the IR drop in the chip are large, difficulty of design or period for design increases and the circuit operation becomes unstable.

SUMMARY OF THE INVENTION

According to an aspect of the invention, there is provided a method for designing a semiconductor integrated circuit, including: disposing a plurality of cells in a cell layout region on the basis of a net list indicating connection relations of the plurality of cells to satisfy a setup timing condition; generating a plurality of power regions dividing the cell layout region into plurality; calculating a consumption current of each of the power regions by using a cell power file indicating a consumption current of each of the cells; adjusting layout positions of the temporarily disposed cells with reference to the consumption current of each of the power regions in a range that the setup timing condition is not violated; and optimizing hold timing of the cells after the position adjustment of the cells.

According to another aspect of the invention, there is provided a method for designing a semiconductor integrated circuit, including: temporarily disposing a plurality of cells in a cell layout region on the basis of a net list indicating connection relations of the plurality of cells to satisfy a setup timing condition and a hold timing condition; generating a plurality of power regions dividing the cell layout region into plurality; calculating a consumption current of each of the power regions by using a cell power file indicating a consumption current of each of the cells; and adjusting layout positions of the temporarily disposed cells with reference to the consumption current of each of the power regions in a range that the setup timing condition and the hold timing condition are not violated.

DETAILED DESCRIPTION OF THE INVENTION

The method for designing a semiconductor integrated circuit according to embodiments of the invention is applied to a layout phase of laying out a plurality of cells that are circuit components constituting a semiconductor integrated circuit.

The cell can be realized by NMOS or PMOS, and is a basic cell constituting a functional circuit such as AND, OR, inverter, buffer, NAND, or flipflop or is a complex cell in which the basic cells are combined.

Hereinafter, embodiments of the invention will be described with reference to drawings. The same signs are appended to the same components in each of the figures.

First Embodiment

Figure 1:
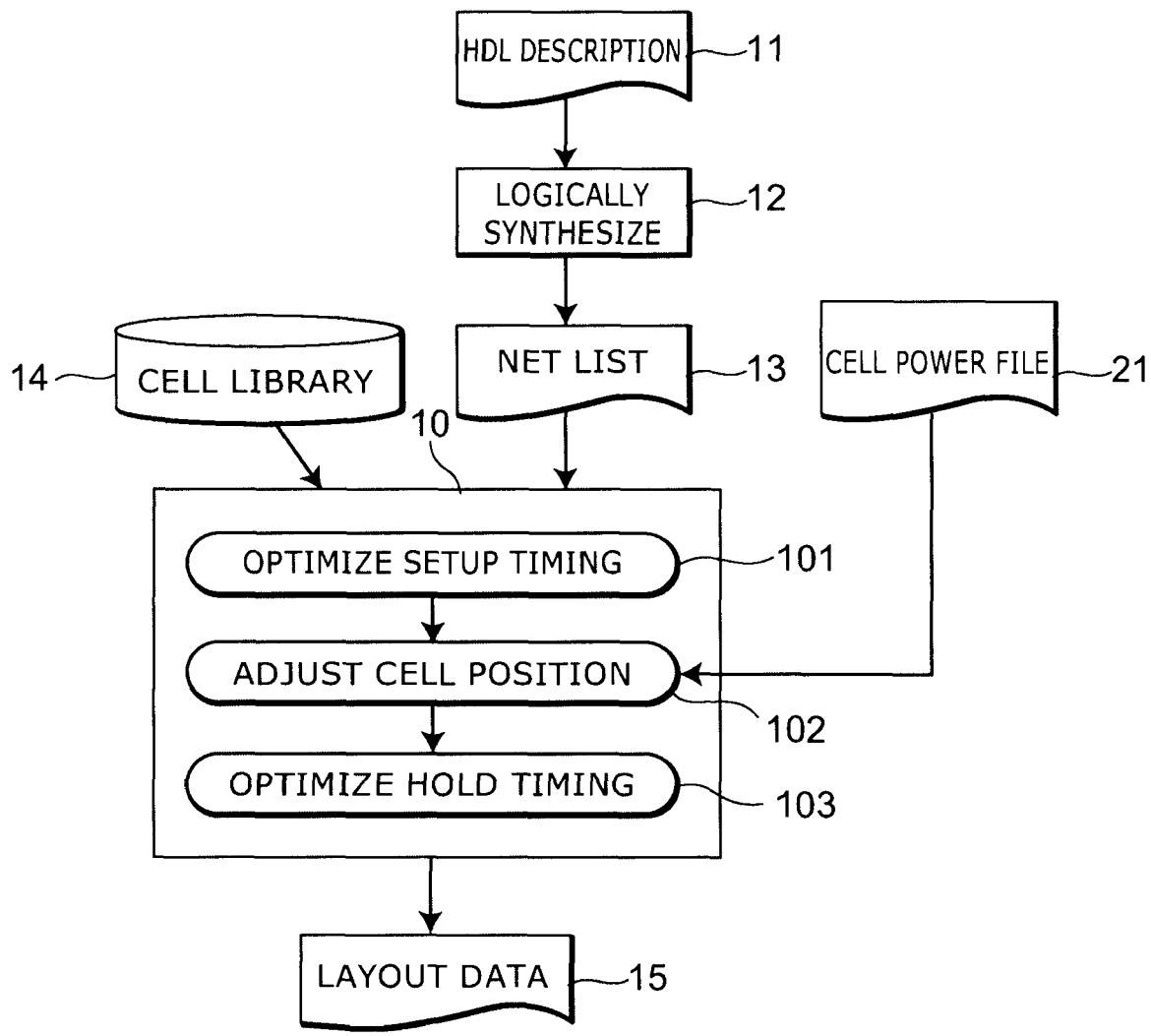
FIG. 1 is a schematic view showing a flow of the method for designing a semiconductor integrated circuit according to a first embodiment of the invention.

FIG. 1 is a schematic view showing a flow of the method for designing a semiconductor integrated circuit according to a first embodiment of the invention.

First, function design data 11 of the circuit whose operation is defined by, for example, HDL (Hardware Description Language) is logically synthesized by a logic synthesis tool (Step 12), and a file called as a net list 13 indicating connection relations of a plurality of cells is generated.

The net list 13, a cell library 14 indicating information of delay time or the like in the net list 13, and a cell power file 21 to be described later are inputted to a processing device 10 through an input device. The processing device 10 reads a design program of the semiconductor integrated circuit according to this embodiment and executes the processing to be described as follows under its instruction.

First, setup timing is optimized (Step 101). The optimization of setup timing is processed for making each of the cells satisfy the setup time that is one of parameters providing timing of the signal of the digital circuit.

In inputting the digital signal from the outside to the semiconductor integrated circuit, data is provided with in accordance with a timing signal such as clock signal indicating the timing of prescribing the import of the data, but for certainly performing this, it is necessary that the data signal line fixes the content (H or L) prior to the timing signal and furthermore that the state is held for a while after providing the timing signal.

The minimum time that the data signal has to be preliminarily fixed and held prior to the timing signal is a setup time.

Moreover, as another parameter providing timing of a signal of the digital circuit, there is a hold time, and the hold time is the minimum time that the data signal has to be held after providing the timing signal. The condition satisfying the hold time is a hold timing condition to be described later.

Figure 2:
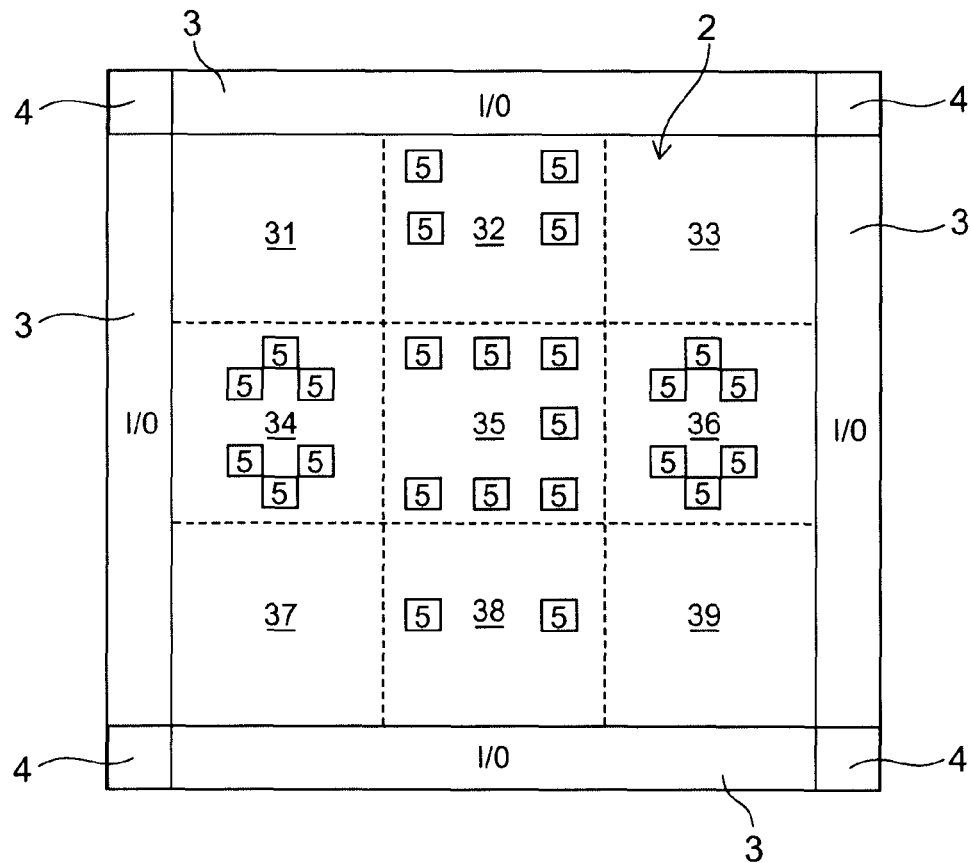
FIG. 2 is a schematic view showing a layout example of the cells in one semiconductor chip.

In Step 101, for satisfying the setup timing condition, a plurality of cells are disposed. In FIG. 2, a layout example of the cells in one semiconductor chip is shown.

The plurality of cells to be objects of the layout design in this embodiment are cells 5 disposed in a cell layout region 2 provided inside I/O (Input/Output) cell groups 3 and corner cells 4 that are provided in the chip ends. The layout position of each of the cells 5 is determined on the basis of the above net list 13 and the cell library 14 and with being constrained so as not to violate the setup timing condition.

The cell layout in Step 101 is temporary, and next, the cell position is adjusted in Step 102.

Figure 3:
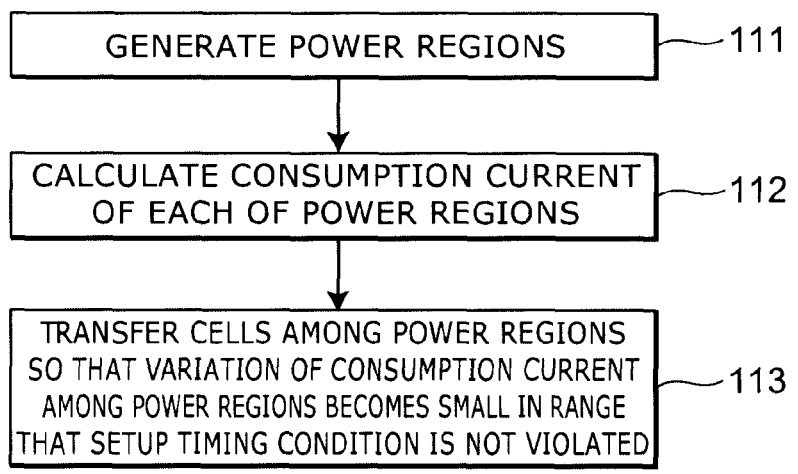
FIG. 3 is a specific flow of the cell position adjustment in the first embodiment of the invention.

In FIG. 3, a specific flow of the cell position adjustment is shown.

First, power regions in which the cell layout region 2 is divided into plurality are generated (Step 111). In the example shown in FIG. 2, as shown by sectioning the cell layout region 2 with dot lines, for example, nine power regions 31 to 39 are generated. However, the number of the power regions may be other than nine, and the magnitude of each of the power regions is not necessarily the same and may be different. Furthermore, each of the power regions is not necessarily quadrangular, and its shape can be optionally set.

Next, by using the cell power file 21 (preliminarily stored in a recording apparatus) indicating a consumption current of each of the cells 5, a consumption current of each of the power regions 31 to 39 is calculated (Step 112). Specifically, for each of the power regions 31 to 39, the maximum (maximum consumption current) in the consumption currents of the individual cells 5 disposed respectively and an average consumption current of each of the cells 5 are calculated. For example, for the power region 34, the maximum in the consumption currents of six cells 5 disposed (temporarily disposed) on the power region 34 is set to be the maximum consumption current of the power region 34, and the average consumption current of the six cells 5 is set to be the average consumption current of the power region 34.

As the subsequent Step 113, with reference to the consumption current of each of the power regions 31 to 39 obtained in Step 112, the layout positions of the temporarily disposed cells 5 are adjusted. Specifically, the positions of the cells 5 are adjusted so that variations of the maximum consumption currents and the average consumption currents among the power regions 31 to 39 become small.

For example, in the example shown in FIG. 2, a larger number of cells 5 are aggregated in the power regions 34 to 36 than in the other power regions 31 to 33 and 37 to 39, and when the maximum consumption currents and the average consumption currents in the power regions 34 to 36 are larger than those of the other power regions 31 to 33, 37 to 39. Accordingly, in this embodiment, some of the cells 5 that are temporarily disposed in the power regions 34 to 36 are transferred to other power regions, and thereby, the variations of the maximum consumption currents and the average consumption currents among the power region 31 to 39 are suppressed, and uniformization is achieved.

However, the cells 5 are transferred under the constraint that the setup timing condition is not violated. By the above processing in Step 101, each of the cells 5 is disposed (temporarily disposed) in a position satisfying the setup timing condition, and when the cell is displaced from the position, the setup timing also changes. The cells 5 that do not violate the setup timing condition (the setup timing is contained in the variation in the range satisfying the setup timing condition) even if the positions thereof are moved are to be transferred in Step 113.

After position adjustment of the cells 5, in the subsequent Step 103 (FIG. 1), the hold timing of the cells 5 is optimized. Specifically, new cells are added in the cell layout region 2 so that each of the cells 5 satisfies the above hold timing condition.

Through the above processing, the position of each of the cells 5 is determined in the cell layout region 2, and is output as layout data 15. On the basis of the layout data 15, a mask is fabricated in the post process, and by using the mask, the circuit pattern transfer is performed onto the semiconductor wafer, and thereby, the manufacturing process of the semiconductor device becomes advanced.

According to this embodiment, as described above, the cell is disposed in consideration of distribution of the consumption current in the cell layout region 2 in addition to the timing conditions (the setup timing condition and the hold timing condition). That is, by performing position adjustment of the cells 5 so that variations of the maximum consumption currents and the average consumption currents among the power regions 31 to 39 dividing the cell layout region 2 into plurality become small, uniformization of the consumption current distribution in the entirety of the cell layout region 2 can be achieved. Thereby, reduction of the maximum value and the variation of the IR drop in the chip can be achieved, and stabilization of the circuit operation and easier design can be realized.

Second Embodiment

Figure 4:
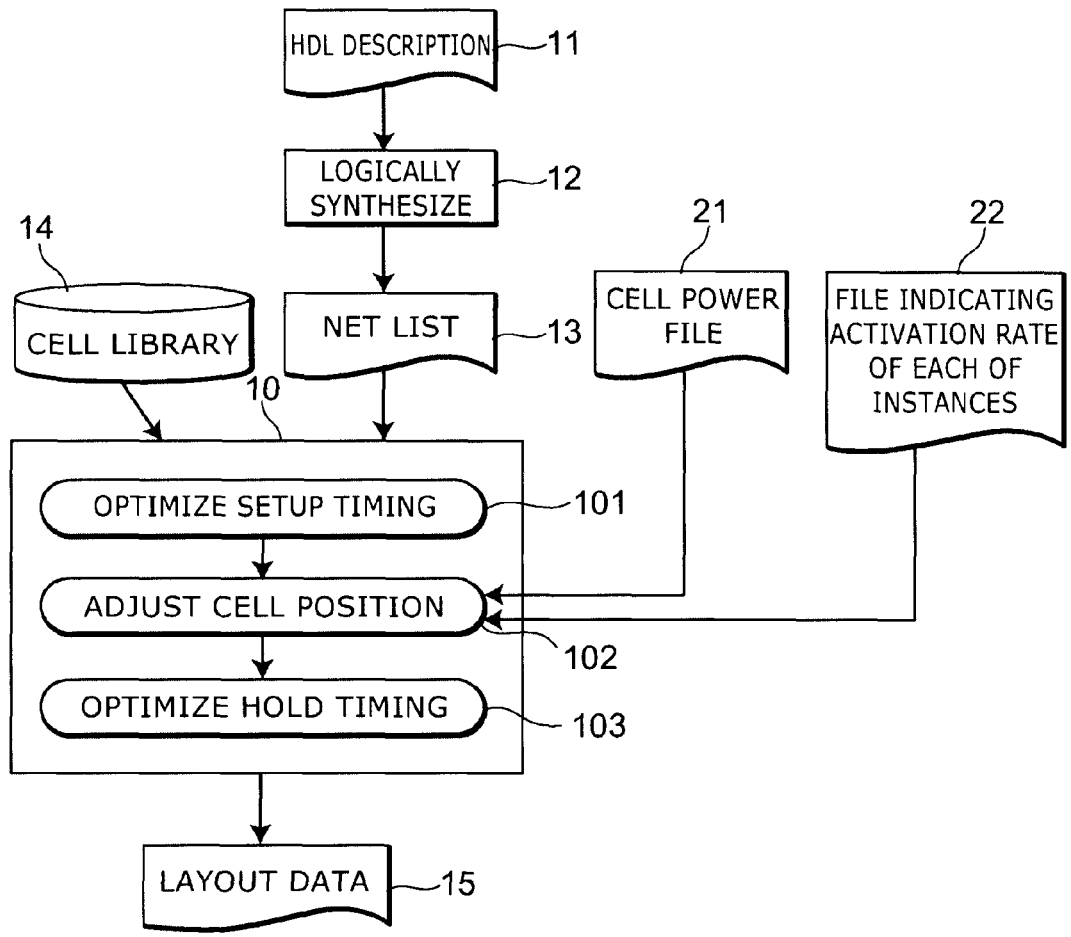
FIG. 4 is a schematic view showing a flow of the method for designing a semiconductor integrated circuit according to a second embodiment of the invention.

Next, FIG. 4 is a schematic view showing a flow of the method for designing a semiconductor integrated circuit according to a second embodiment of the invention.

In the above first embodiment, in calculating the maximum consumption current and the average consumption current of each of the power regions 31 to 39, the calculation is performed assuming that all of the cells 5 operate in each of the clock cycles. However, when an actual product is thought, all of the cells 5 do not always operate in each of the clock cycles. Accordingly, in this embodiment, by using a file 22 indicating activation rate of each of instances in addition to the cell power file 21, the maximum consumption current and the average consumption current of each of the power regions 31 to 39 are calculated.

The plurality of cells 5 include cells indicating the same logic, however they are not treated as one cell but the individually identified cells are set to be instances. And, the activation rate of each of the instances represents a ratio of the number of times each of the instances operates to the number of times of the clock cycles (operation frequency).

In this embodiment, in addition to the above net list 13, the cell library 14 and the cell power file 21, the file 22 indicating the activation rate of each of the instances is also inputted to the processing device 10 through the input device. The processing device 10 reads a design program of the semiconductor integrated circuit according to this embodiment and executes the processing to be described as follows under its instruction.

First, in the same manner as the above first embodiment, setup timing is optimized (Step 101). Thereby, each of the cells 5 is temporarily disposed in the cell layout region 2 on the basis of the net list 13 and the cell library 14 and so as to satisfy the setup timing condition.

Next, the cell position adjustment is performed in Step 102. First, in the same manner as the first embodiment, the power regions 31 to 39 are generated. Then, the maximum consumption current and the average consumption current of each of the power regions 31 to 39 are calculated. However, in this embodiment, the file 22 indicating the activation rate of each of instances is used for this calculation.

Specifically, the activation rate of each of the instances is multiplied by the consumption current of the corresponding cell (obtained from the cell power file 21) to calculate the consumption current of each of the individual instances, and based thereon, the maximum consumption current and the average consumption current of each of the power regions 31 to 39 are calculated. As a result, the consumption current distribution in the chip that is nearer to that of the actual operation can be obtained.

Hereafter, the processing is performed in the same manner as the first embodiment. That is, the positions of cells 5 are adjusted so that variations of the maximum consumption currents and the average consumption currents among the power regions 31 to 39 become small. Of course, this cell position adjustment is also performed under the constraint that the setup timing condition is not violated. After the position adjustment of the cells 5, in the subsequent Step 103, the hold timing of the cells 5 is optimized.

Also in this embodiment, the cell is disposed in consideration of distribution of the consumption current in the cell layout region 2 in addition to the timing conditions (the setup timing condition and the hold timing condition). That is, by performing position adjustment of the cells 5 so that variations of the maximum consumption currents and the average consumption currents among the power regions 31 to 39 dividing the cell layout region 2 into plurality become small, uniformization of the consumption current distribution in the entirety of the cell layout region 2 can be achieved. Thereby, reduction of the maximum value and the variation of the IR drop in the chip can be achieved, and stabilization of the circuit operation and easier design can be realized.

Furthermore, in this embodiment, by using the activation rate of each of the instances in calculating the consumption currents of the power regions, the consumption current distribution in the chip that is nearer to that of the actual operation can be obtained, and by performing the cell position adjustment with recognizing this, reduction of the maximum value and the variation of the IR drop in the chip can be realized more appropriately.

Third Embodiment

Figure 5:
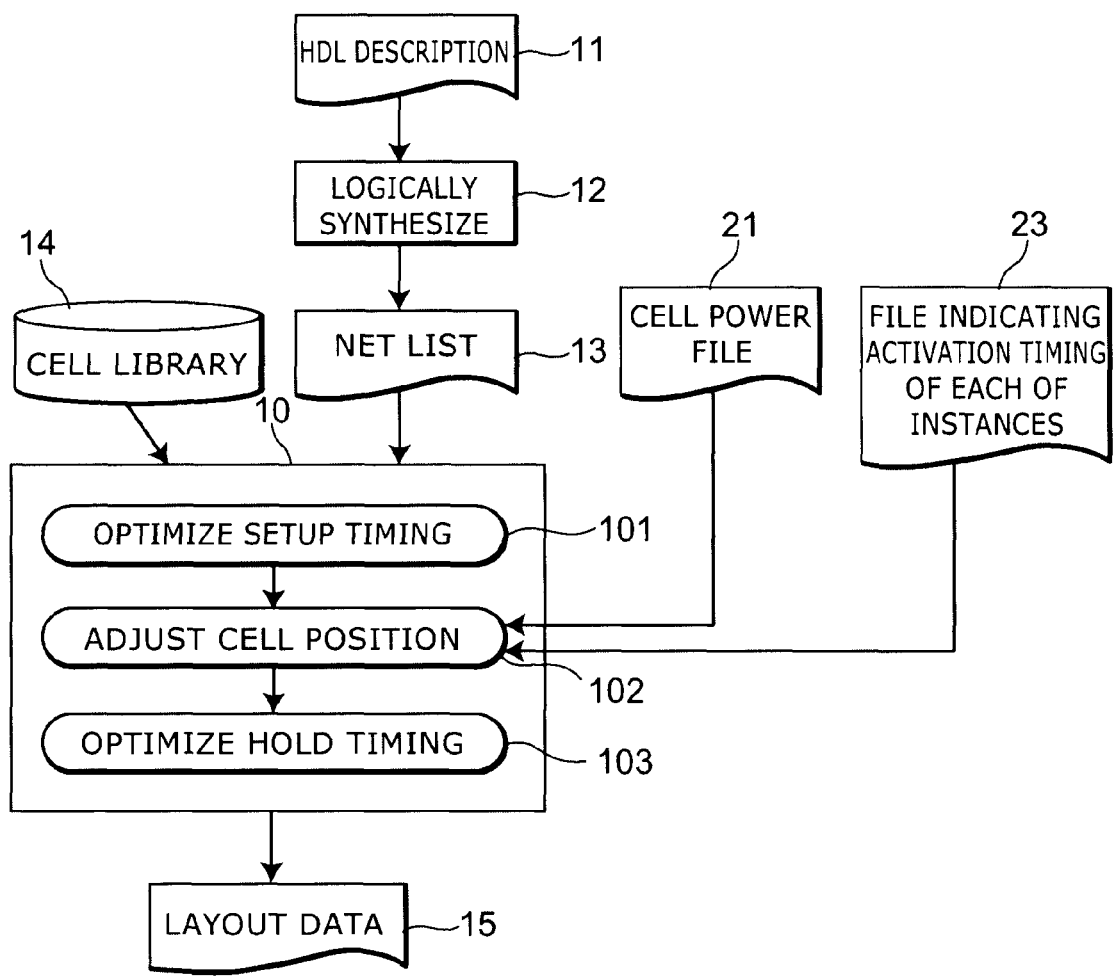
FIG. 5 is a schematic view showing a flow of the method for designing a semiconductor integrated circuit according to a third embodiment of the invention.

Next, FIG. 5 is a schematic view showing a flow of the method for designing a semiconductor integrated circuit according to a third embodiment of the invention.

As the number of instances that operate simultaneously of the plurality of instances disposed in a region is larger, the IR drop in the region tends to be larger, and if the number of the instances operating simultaneously is small, the IR drop tends to be small.

Accordingly, in this embodiment, also by using a file 23 indicating an activation timing indicating the operation timing on the time axis of each of the instances, the maximum consumption current and the average consumption current of each of the power regions 31 to 39 are calculated. From the file 23 indicating the activation timing of each of the instances, the relation of the operation timings of the mutual instances can be recognized.

In this embodiment, in addition to the above net list 13, the cell library 14 and the cell power file 21, the file 23 indicating the activation timing of each of the instances is also inputted to the processing device 10 through the input device. The processing device 10 reads a design program of the semiconductor integrated circuit according to this embodiment and executes the processing to be described as follows under its instruction.

First, in the same manner as the above embodiments, setup timing is optimized (Step 101). Thereby, each of the cells 5 is temporarily disposed in the cell layout region 2 on the basis of the net list 13 and the cell library 14 and so as to satisfy the setup timing condition.

Next, the cell position adjustment is performed in Step 102. First, in the same manner as the above embodiments, the power regions 31 to 39 are generated. Then, the maximum consumption current and the average consumption current of each of the power regions 31 to 39 are calculated. However, in this calculation, in this embodiment, the file 23 indicating the activation timing of each of the instances is used.

Specifically, for each of the power regions, by using only the consumption currents of the instances having the same activation timing (operating at the same time) out of the individually disposed instances, the maximum consumption current and the average consumption current in the power region are calculated. When the activation timings of all of the instances disposed in one power region are the same (the instances operates at the same time), the maximum consumption current and the average consumption current in the power region are calculated by using the consumption currents of all of the instances.

Hereafter, the processing is performed in the same manner as the above embodiments. That is, the positions of cells 5 are adjusted so that variations of the maximum consumption currents and the average consumption currents among the power regions 31 to 39 become small. This cell position adjustment is also performed under the constraint that the setup timing condition is not violated. After the position adjustment of the cells 5, in the subsequent Step 103, the hold timing of the cells 5 is optimized.

Also in this embodiment, the cell is disposed in consideration of distribution of the consumption current in the cell layout region 2 in addition to the timing conditions (the setup timing condition and the hold timing condition). That is, by performing position adjustment of the cells 5 so that variations of the maximum consumption currents and the average consumption currents among the power regions 31 to 39 dividing the cell layout region 2 into plurality become small, uniformization of the consumption current distribution in the entirety of the cell layout region 2 can be achieved. Thereby, reduction of the maximum value and the variation of the IR drop in the chip can be achieved, and stabilization of the circuit operation and easier design can be realized.

Furthermore, in this embodiment, by using the activation timing of each of the instances in calculating the consumption currents of the power regions, the consumption current distribution in the chip that is nearer to that of the actual operation can be obtained, and by performing the cell position adjustment with recognizing this, reduction of the maximum value and the variation of the IR drop in the chip can be realized more appropriately.

Fourth Embodiment

Figure 6:
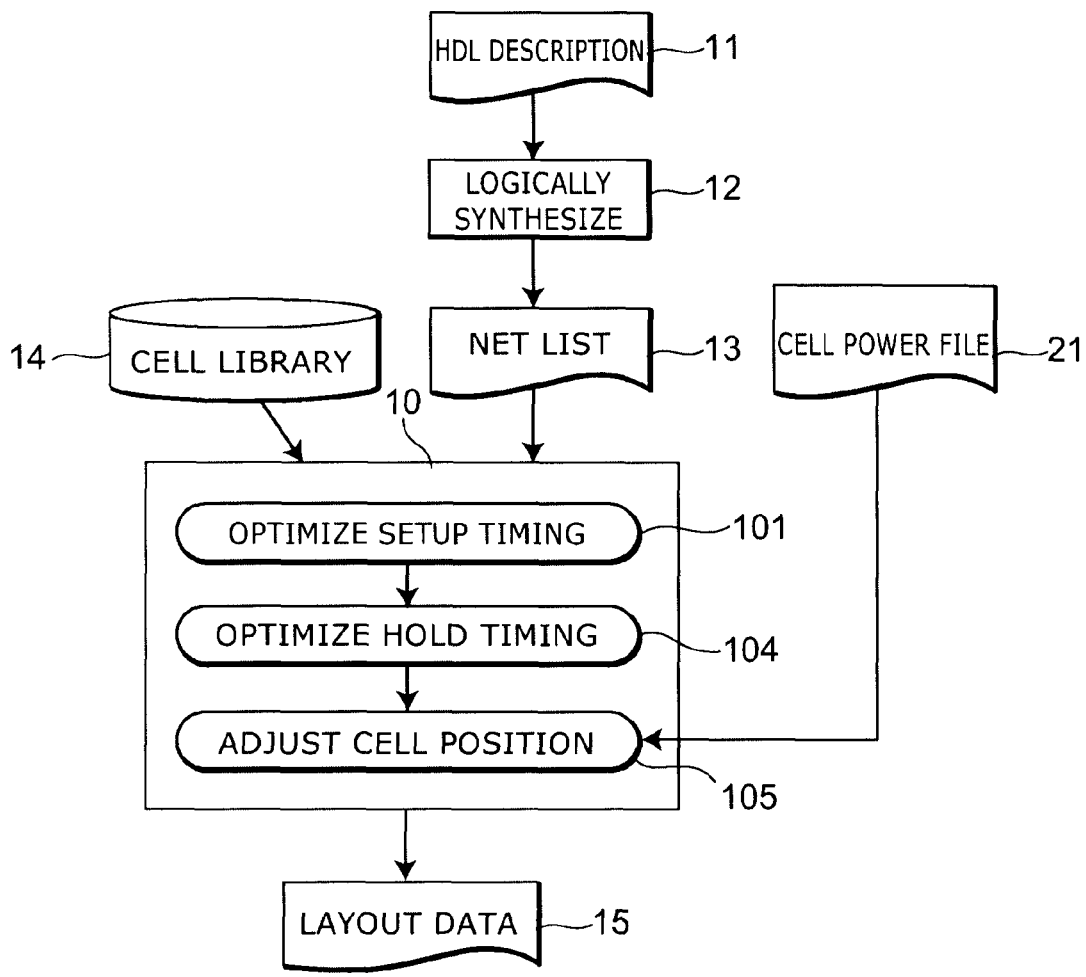
FIG. 6 is a schematic view showing a flow of the method for designing a semiconductor integrated circuit according to a fourth embodiment of the invention.

Next, FIG. 6 is a schematic view showing a flow of the method for designing a semiconductor integrated circuit according to a fourth embodiment of the invention.

Also in this embodiment, in the same manner as the first embodiment, the net list 13, the cell library 14 and the cell power file 21 are inputted to the processing device 10 through the input device. The processing device 10 reads a design program of the semiconductor integrated circuit according to this embodiment and executes the processing to be described as follows under its instruction.

First, setup timing is optimized (Step 101). That is, each of the cells 5 is disposed in the cell layout region 2 so as to satisfy the setup timing condition.

Subsequently, in this embodiment, the hold timing is optimized (Step 104). Specifically, new cells are added to the cell layout region 2 so that each of the cells 5 satisfies the above-described hold timing condition.

By the above processing, each of the cells 5 is temporarily disposed in the cell layout region 2 on the basis of the net list 13 and the cell library 14 and with being constrained so that the setup timing condition and the hold timing condition are not violated.

Figure 7:
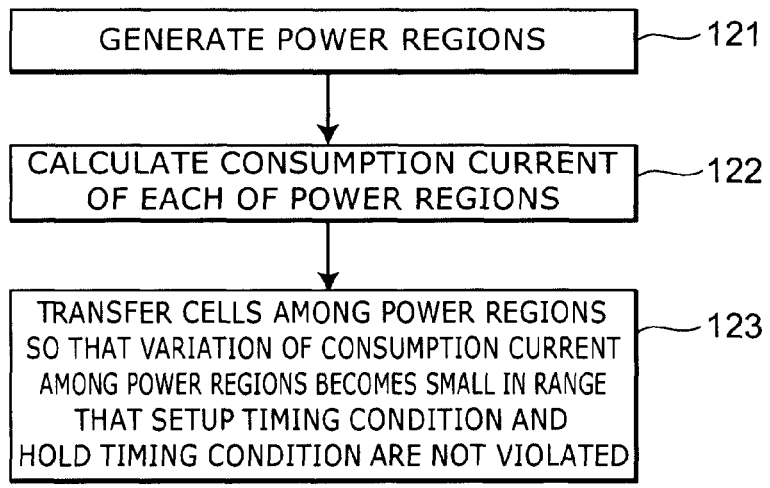
FIG. 7 is a specific flow of the cell position adjustment in the fourth embodiment of the invention.

Next, the cell position adjustment is performed in Step 105. In FIG. 7, a specific flow of the cell position adjustment is shown.

First, in the same manner as the above embodiments, power regions 31 to 39 dividing the cell layout region 2 into plurality are generated (Step 121).

Next, by using the cell power file 21 indicating the consumption current of each of the cells 5, the maximum consumption current and the average consumption current of each of the power regions 31 to 39 are calculated (Step 122).

As the subsequent Step 123, the positions of the cells 5 are adjusted so that variations of the maximum consumption currents and the average consumption currents among the power regions 31 to 39 become small.

In this embodiment, the cells 5 are transferred under the constraint that the setup timing condition and the hold timing condition are not violated. By the above processing in Step 101 and Step 104, each of the cells 5 have been disposed (temporarily disposed) at the positions of satisfying the setup timing condition and the hold timing condition, and when the cell is displaced from the position, the setup timing and the hold timing also change. The cells 5 that do not violate the setup timing condition and the hold timing condition even if the positions thereof are moved are to be transferred in Step 123.

Through the processing described above, the positions of each of the cells 5 in the cell layout region 2 are determined, and are outputted as the layout data 15.

According to this embodiment, the cell is disposed in consideration of distribution of the consumption current in the cell layout region 2 in addition to the timing conditions (the setup timing condition and the hold timing condition). That is, by performing position adjustment of the cells 5 so that variations of the maximum consumption currents and the average consumption currents among the power regions 31 to 39 dividing the cell layout region 2 into plurality become small, uniformization of the consumption current distribution in the entirety of the cell layout region 2 can be achieved. Thereby, reduction of the maximum value and the variation of the IR drop in the chip can be achieved, and stabilization of the circuit operation and easier design can be realized.

By optimization process of the hold timing, new cells (cells for Hold Timing Fix) are added to the cell layout region 2. When the hold timing optimization is performed after the cell position adjustment as the above first to third embodiments, variation is caused in the consumption current distribution in the chip obtained by the cell position adjustment by the consumption currents of the added cells, and it is feared that the maximum value or variation of the IR drop in the chip becomes large.

By contrast, by performing the cell position adjustment after the optimization process of the hold timing is accomplished, there are few cells that are added or deleted after the cell position adjustment, reduction of the maximum value and the variation of the IR drop in the chip can be realized more certainly.

In the cell position adjustment after the hold timing optimization, the cells added in the hold timing optimization is also to be treated, the processing time tends to increase with the increased number of the cells. Therefore, it is sufficient that the IR drop maximum value and variation reduction effect are obtained to a certain extent, and in the case of giving priority to the processing time, it is desirable to perform the cell position adjustment before the optimization process of the hold timing like the first to third embodiments.

Fifth Embodiment

Figure 8:
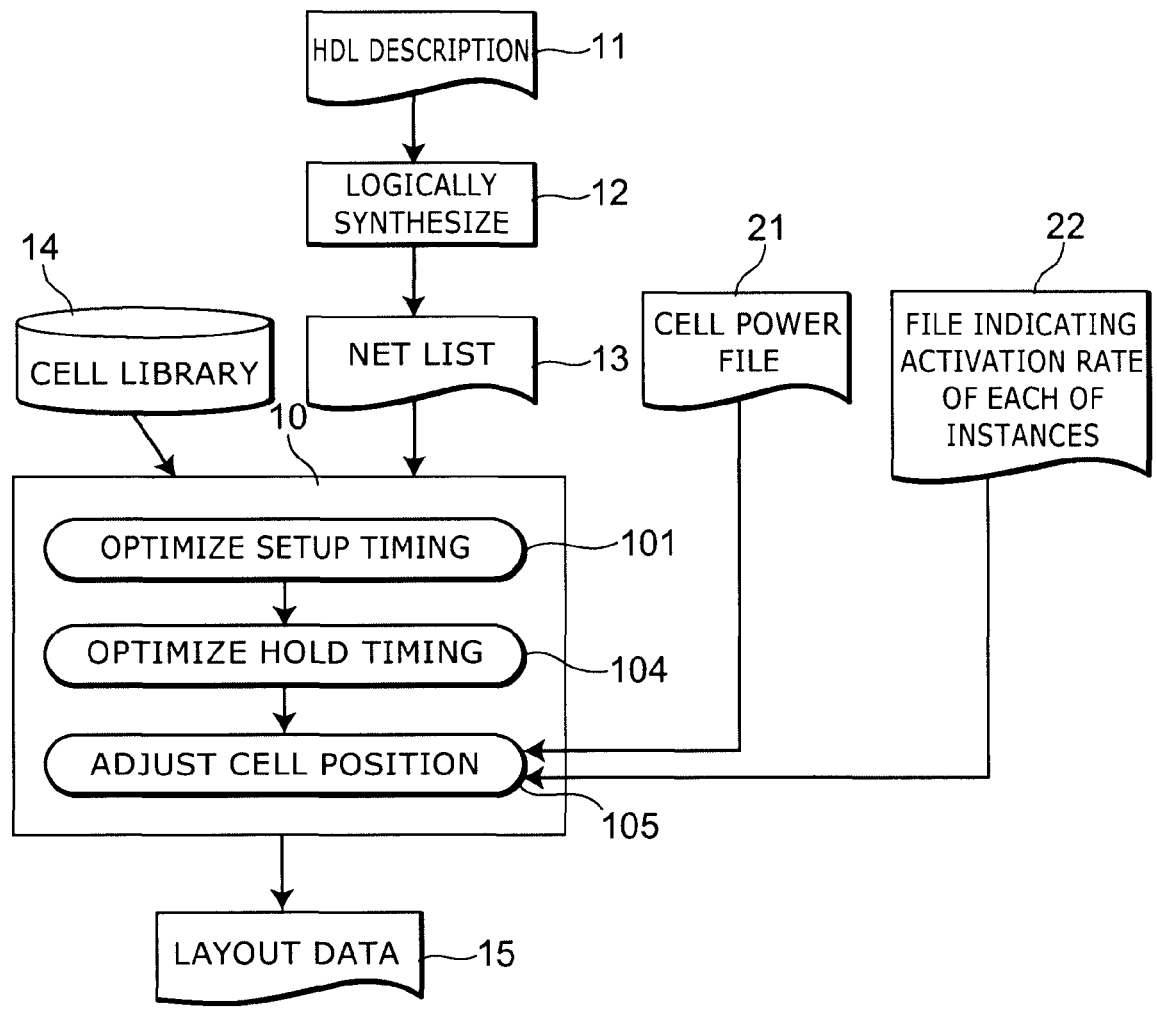
FIG. 8 is a schematic view showing a flow of the method for designing a semiconductor integrated circuit according to a fifth embodiment of the invention.

Next, FIG. 8 is a schematic view showing a flow of the method for designing a semiconductor integrated circuit according to a fifth embodiment of the invention.

In this embodiment, similarly to the second embodiment, also by using the file 22 indicating the activation rate of each of the instances, the maximum consumption current and the average consumption current of each of the power regions 31 to 39 are calculated.

The net list 13, the cell library 14, the cell power file 21, and the file 22 indicating the activation rate of each of the instances are inputted to the processing device 10 through the input device. The processing device 10 reads a design program of the semiconductor integrated circuit according to this embodiment and executes the processing to be described as follows under its instruction.

First, the setup timing is optimized (Step 101). Furthermore, subsequently, the hold timing is optimized (Step 104). Thereby, each of the cells 5 is temporarily disposed in the cell layout region 2 on the basis of the net list 13 and the cell library 14 and so as to satisfy the setup timing condition and the hold timing condition.

Next, the cell position adjustment is performed in Step 105. First, the power regions 31 to 39 are generated. Then, the maximum consumption current and the average consumption current of each of the power regions 31 to 39 are calculated. However, in this embodiment, the file 22 indicating the activation rate of each of instances is used for this calculation.

Specifically, the activation rate of each of the instances is multiplied by the consumption current of the corresponding cell (obtained from the cell power file 21) to calculate the consumption current of each of the individual instances, and based thereon, the maximum consumption current and the average consumption current of each of the power regions 31 to 39 are calculated. As a result, the consumption current distribution in the chip that is nearer to that of the actual operation can be obtained.

Next, the positions of cells 5 are adjusted so that variations of the maximum consumption currents and the average consumption currents among the power regions 31 to 39 become small. This cell position adjustment is performed under the constraint that the setup timing condition and the hold timing condition are not violated.

Also in this embodiment, the cell is disposed in consideration of distribution of the consumption current in the cell layout region 2 in addition to the timing conditions (the setup timing condition and the hold timing condition). That is, by performing position adjustment of the cells 5 so that variations of the maximum consumption currents and the average consumption currents among the power regions 31 to 39 dividing the cell layout region 2 into plurality become small, uniformization of the consumption current distribution in the entirety of the cell layout region 2 can be achieved. Thereby, reduction of the maximum value and the variation of the IR drop in the chip can be achieved, and stabilization of the circuit operation and easier design can be realized.

Furthermore, in this embodiment, by using the activation rate of each of the instances in calculating the consumption currents of the power regions, the consumption current distribution in the chip that is nearer to that of the actual operation can be obtained, and by performing the cell position adjustment with recognizing this, reduction of the maximum value and the variation of the IR drop in the chip can be realized more appropriately.

Moreover, by performing the cell position adjustment after the optimization process of the hold timing is accomplished, there are few cells that are added or deleted after the cell position adjustment, reduction of the maximum value and the variation of the IR drop in the chip can be realized more certainly.

Sixth Embodiment

Figure 9:
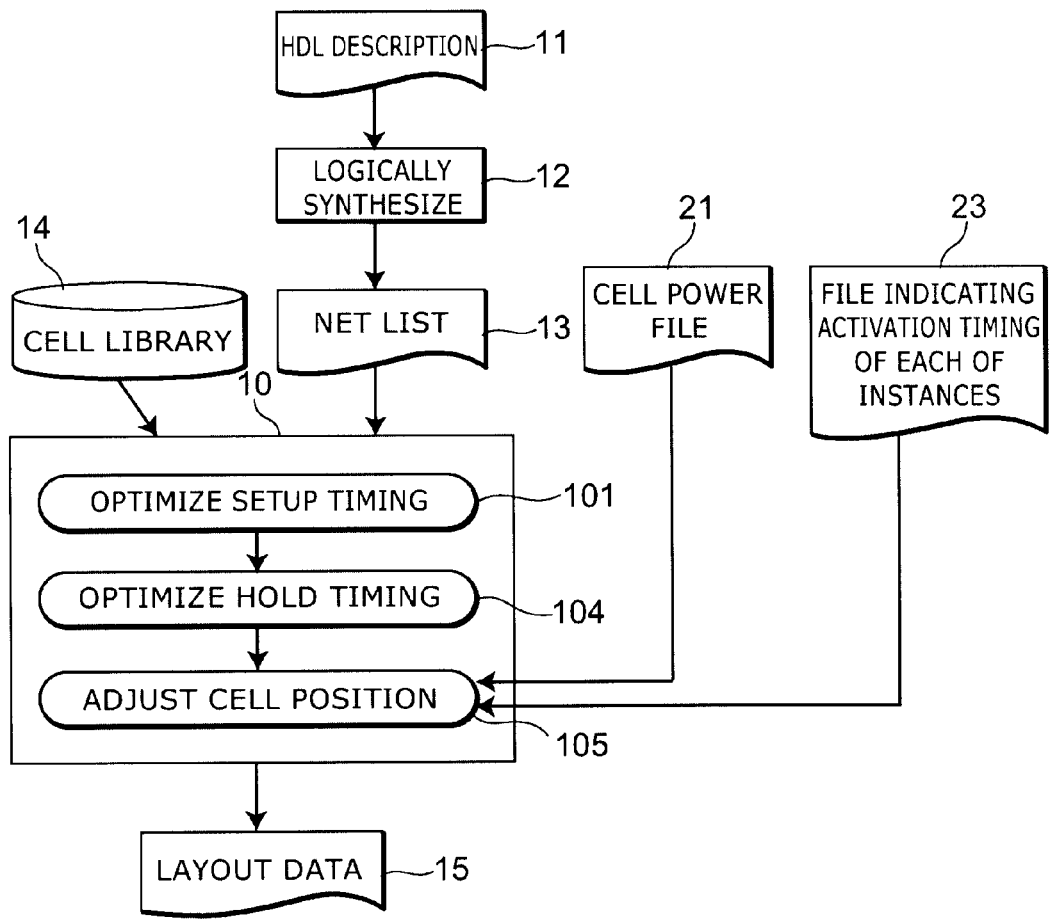
FIG. 9 is a schematic view showing a flow of the method for designing a semiconductor integrated circuit according to a sixth embodiment of the invention.

Next, FIG. 9 is a schematic view showing a flow of the method for designing a semiconductor integrated circuit according to a sixth embodiment of the invention.

In this embodiment, similarly to the above third embodiment, also by using the file 23 indicating the activation timing of each of the instances, the maximum consumption current and the average consumption current of each of the power regions 31 to 39 are calculated.

The net list 13, the cell library 14, the cell power file 21, and the file 23 indicating the activation timing of each of the instances are inputted to the processing device 10 through the input device. The processing device 10 reads a design program of the semiconductor integrated circuit according to this embodiment and executes the processing to be described as follows under its instruction.

First, the setup timing is optimized (Step 101). Furthermore, subsequently, the hold timing is optimized (Step 104). Thereby, each of the cells 5 is temporarily disposed in the cell layout region 2 on the basis of the net list 13 and the cell library 14 and so as to satisfy the setup timing condition and the hold timing condition.

Next, the cell position adjustment is performed in Step 105. First, the power regions 31 to 39 are generated. Then, the maximum consumption current and the average consumption current of each of the power regions 31 to 39 are calculated. However, in this embodiment, the file 23 indicating the activation timing of each of instances is used for this calculation.

Specifically, for each of the power regions, by using only the consumption currents of the instances having the same activation timing (operating at the same time) out of the individually disposed instances, the maximum consumption current and the average consumption current in the power region are calculated.

Next, the positions of cells 5 are adjusted so that variations of the maximum consumption currents and the average consumption currents among the power regions 31 to 39 become small. This cell position adjustment is performed under the constraint that the setup timing condition and the hold timing condition are not violated.

Also in this embodiment, the cell is disposed in consideration of distribution of the consumption current in the cell layout region 2 in addition to the timing conditions (the setup timing condition and the hold timing condition). That is, by performing position adjustment of the cells 5 so that variations of the maximum consumption currents and the average consumption currents among the power regions 31 to 39 dividing the cell layout region 2 into plurality become small, uniformization of the consumption current distribution in the entirety of the cell layout region 2 can be achieved. Thereby, reduction of the maximum value and the variation of the IR drop in the chip can be achieved, and stabilization of the circuit operation and easier design can be realized.

Furthermore, in this embodiment, by using the activation timing of each of the instances in calculating the consumption currents of the power regions, the consumption current distribution in the chip that is nearer to that of the actual operation can be obtained, and by performing the cell position adjustment with recognizing this, reduction of the maximum value and the variation of the IR drop in the chip can be realized more appropriately.

Moreover, by performing the cell position adjustment after the optimization process of the hold timing is accomplished, there are few cells that are added or deleted after the cell position adjustment, reduction of the maximum value and the variation of the IR drop in the chip can be realized more certainly.

Seventh Embodiment

Figure 10:
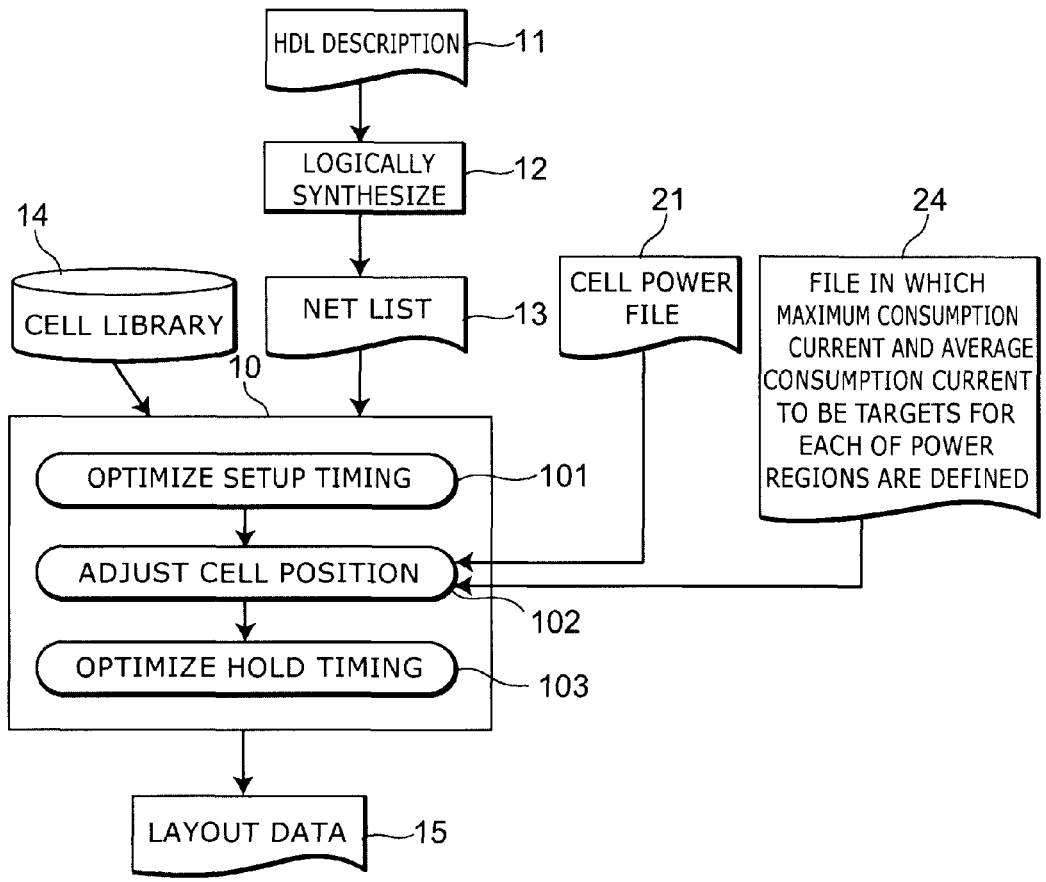
FIG. 10 is a schematic view showing a flow of the method for designing a semiconductor integrated circuit according to a seventh embodiment of the invention.

Next, FIG. 10 is a schematic view showing a flow of the method for designing a semiconductor integrated circuit according to a seventh embodiment of the invention.

In this embodiment, the net list 13, the cell library 14, the cell power file 21, and a file 24 indicating a target consumption current of each of power regions are inputted to the processing device 10 through the input device. The processing device 10 reads a design program of the semiconductor integrated circuit according to this embodiment and executes the processing to be described as follows under its instruction.

First, the setup timing is optimized (Step 101). Thereby, each of the cells 5 is temporarily disposed in the cell layout region 2 on the basis of the net list 13 and the cell library 14 and with being constrained so that the setup timing condition is not violated.

Figure 11:
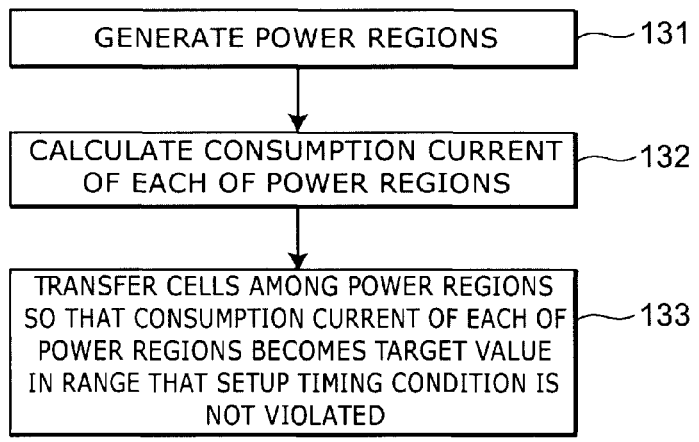
FIG. 11 is a specific flow of the cell position adjustment in the seventh embodiment of the invention.

Next, the cell position adjustment is performed in Step 102. In FIG. 11, a specific flow of the cell position adjustment is shown.

First, power regions 31 to 39 dividing the cell layout region 2 into plurality are generated (Step 131). Next, by using the cell power file 21 indicating the consumption current of each of the cells 5, the maximum consumption current and the average consumption current of each of the power regions 31 to 39 are calculated (Step 132).

As the subsequent Step 133, the layout positions of the temporarily disposed cells 5 are adjusted with reference to the consumption current (the maximum consumption current and the average consumption current) of each of the power regions 31 to 39 obtained in the above Step 132 and the file 24 indicating the target consumption current (target maximum consumption current and target average consumption current) of each of the power regions.

In actual semiconductor chip products, even in the cases of the power regions having the same consumption current, there is difference in the IR drop according to the positions of the power regions in the chip. The terminal to be an inlet of current supply for the circuit formed on the chip is generally provided in the end of the chip, and therefore, the IR drop is smaller as the position is nearer to the end of the chip, and the IR drop is larger as the position is nearer to the central part of the chip that is far from the chip end. Therefore, when the consumption current distribution is contemplated in order to suppress the variation of the IR drop in the chip, it becomes the design suitable for the actual products that the consumption current is set to be smaller in the power region nearer to the central part of the chip and that the consumption current is set to be larger in the power region nearer to the chip end.

Accordingly, in this embodiment, the positions of the cells 5 are adjusted so that the maximum consumption current and the average consumption current of each of the power regions 31 to 39 become target values defined in the above file 24 (or become near to the target values) respectively.

In the example of FIG. 2, in the target consumption current (the target maximum consumption current and the target average consumption current) that is set in each of the power regions, the target consumption current (the target maximum consumption current and the target average consumption current) that is set in the power region 35 of the central part of the chip is the smallest.

By adjusting the consumption current of each of the power regions to be near to the target consumption current as much as possible by appropriately transferring the cells 5 to other power regions, as a result, the maximum value and variation of the IR drop in the chip can be reduced.

Also in this embodiment, the cells 5 are transferred under the constraint that the setup timing condition is not violated.

After the position adjustment of the cells 5, in the subsequent Step 103 (FIG. 10), the hold timing of the cells 5 is optimized. Specifically, new cells are added in the cell layout region 2 so that each of the cells 5 satisfies the hold timing condition.

Through the above processing, the position of each of the cells 5 is determined in the cell layout region 2, and is outputted as the layout data 15.

According to this embodiment, as described above, the cell is disposed in consideration of distribution of the consumption current in the cell layout region 2 in addition to the timing conditions (the setup timing condition and the hold timing condition). That is, by performing position adjustment of the cells 5 so that each of the maximum consumption current and the average consumption current in each of the power regions 31 to 39 becomes the target value or near thereto, as a result, reduction of the maximum value and the variation of the IR drop in the chip can be achieved, and stabilization of the circuit operation and easier design can be realized.

That is, in this embodiment, by defining the maximum consumption current and the average consumption current to be targets for each of the power regions, the consumption current distribution in the chip can be set to flexibly correspond to various factors relating to the power supply such as wiring of the power, and reduction of the maximum value and the variation of the IR drop in the chip can be realized more appropriately.

Eighth Embodiment

Figure 12:
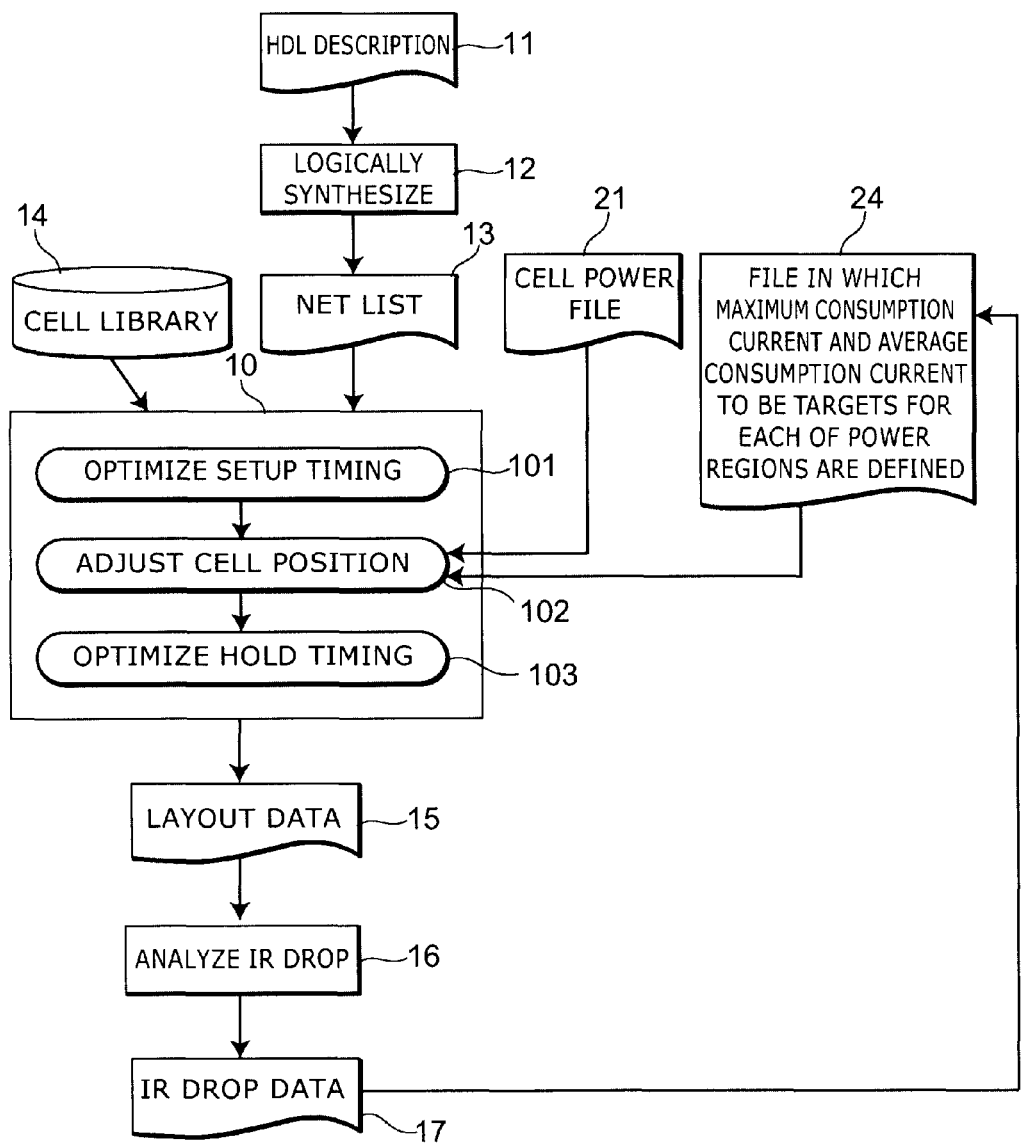
FIG. 12 is a schematic view showing a flow of the method for designing a semiconductor integrated circuit according to an eighth embodiment of the invention.

By adding such a feedback loop as shown in FIG. 12 in the above seventh embodiment shown in FIG. 10, reduction of the maximum value and the variation of the IR drop in the chip can be performed more appropriately.

That is, on the basis of the layout data 15 obtained in the processing of the seventh embodiment, the IR drop in the chip is analyzed, and the IR drop level of each of the power regions is obtained as the IR drop data 17.

And, with reference to the IR drop data 17, the target consumption current set value of each of the power regions is modified. For example, for the power region having a larger IR drop level than the other power regions, the set value of the target consumption current is modified to be smaller than the current value.

And, by performing the above cell position adjustment again so that the consumption current becomes the target value appropriately modified based on the IR drop level (or becomes near thereto), as a result, the maximum value and the variation of the IR drop in the chip after the adjustment can be more reduced.

As described above, the embodiments of the invention has been described with reference to the specific examples. However, the invention is not limited thereto, and various modifications based on the technical ideas of the invention are possible.

The seventh embodiment or the eighth embodiment can be applied in combination with each of the second to sixth embodiments. That is, in the "transferring the cells" of each of the second to sixth embodiments, the cells may be transferred not so that the consumption currents among the power regions are uniformized but so that the consumption current of each of the power regions becomes the target value.

The invention claimed is:

1. A method for designing a semiconductor integrated circuit, comprising:
    temporarily disposing a plurality of cells in a cell layout region on the basis of a net list indicating connection relations of the plurality of cells to satisfy a setup timing condition;
    generating a plurality of power regions dividing the cell layout region into plurality;
    calculating a consumption current of each of the power regions by using a cell power file indicating a consumption current of each of the temporarily disposed cells;
    adjusting layout positions of the temporarily disposed cells with reference to the consumption current of each of the power regions in a range that the setup timing condition is not violated; and
    optimizing hold timing of the cells after adjusting the layout positions of the temporarily disposed cells.

2. The method for designing a circuit according to claim 1, wherein the consumption current of each of the power regions is the maximum consumption current in the consumption currents of each of the temporarily disposed cells disposed in each of the power regions.

3. The method for designing a circuit according to claim 1, wherein the consumption current of each of the power regions is an average consumption current of each of the temporarily disposed cells disposed in each of the power regions.

4. The method for designing a circuit according to claim 1, wherein the consumption current of each of the power regions is calculated by also using a file indicating an activation rate of each of instances in which the temporarily disposed cells indicating the same logic are also individually identified.

5. The method for designing a circuit according to claim 4, wherein the activation rate of each of the instances is multiplied by the consumption current of the corresponding cell obtained from the temporarily disposed cells power file to calculate a consumption current of each of the instances, and based thereon, the consumption current of each of the power regions is calculated.

6. The method for designing a circuit according to claim 1, wherein the consumption current of each of the power regions is calculated by also using a file indicating activation timing of each of instances in which the temporarily disposed cells indicating the same logic are also individually identified.

7. The method for designing a circuit according to claim 6, wherein the consumption current of each of the power regions is calculated by using only consumption currents of instances having the same activation timing in each of the instances disposed in each of the power regions.

8. The method for designing a circuit according to claim 1, wherein the position adjustment of the temporarily disposed cells is performed also with reference to a file indicating a target consumption current of each of the power regions.

9. The method for designing a circuit according to claim 8, wherein the target consumption current that is set in the power region of a central part of a chip is smaller than the target consumption current that is set in the power region of an end of a chip.

10. The method for designing a circuit according to claim 8, further comprising:
performing analysis of IR drop in a chip on the basis of layout data of the cells obtained after optimizing hold timing of the cells and obtaining IR drop data of each of the power regions; and
varying a set value of the target consumption current of each of the power regions with reference to the IR drop data.

11. A method for designing a semiconductor integrated circuit, comprising:
temporarily disposing a plurality of cells in a cell layout region on the basis of a net list indicating connection relations of the plurality of cells to satisfy a setup timing condition and a hold timing condition;
generating a plurality of power regions dividing the cell layout region into plurality;
calculating a consumption current of each of the power regions by using a cell power file indicating a consumption current of each of the temporarily disposed cells; and
adjusting layout positions of the temporarily disposed cells with reference to the consumption current of each of the power regions in a range that the setup timing condition and the hold timing condition are not violated.

12. The method for designing a circuit according to claim 11, wherein the consumption current of each of the power regions is the maximum consumption current in the consumption currents of each of the temporarily disposed cells in each of the power regions.

13. The method for designing a circuit according to claim 11, wherein the consumption current of each of the power regions is an average consumption current of each of the temporarily disposed cells in each of the power regions.

14. The method for designing a circuit according to claim 11, wherein the consumption current of each of the power regions is calculated by also using a file indicating an activation rate of each of instances in which the temporarily disposed cells indicating the same logic are also individually identified.

15. The method for designing a circuit according to claim 14, wherein the activation rate of each of the instances is multiplied by the consumption current of the corresponding temporarily disposed cells obtained from the cell power file to calculate a consumption current of each of the instances, and based thereon, the consumption current of each of the power regions is calculated.

16. The method for designing a circuit according to claim 11, wherein the consumption current of each of the power regions is calculated by also using a file indicating activation timing of each of instances in which the temporarily disposed cells indicating the same logic are also individually identified.

17. The method for designing a circuit according to claim 16, wherein the consumption current of each of the power regions is calculated by using only consumption currents of instances having the same activation timing in each of the instances disposed in each of the power regions.

18. The method for designing a circuit according to claim 11, wherein the position adjustment of the temporarily disposed cells is performed also with reference to a file indicating a target consumption current of each of the power regions.

19. The method for designing a circuit according to claim 18, wherein the target consumption current that is set in the power region of a central part of a chip is smaller than the target consumption current that is set in the power region of an end of a chip.

20. The method for designing a circuit according to claim 18, further comprising:
performing analysis of IR drop in a chip on the basis of layout data of the cells obtained after adjusting the layout positions of the cells to obtain IR drop data of each of the power regions; and
varying a set value of the target consumption current of each of the power regions with reference to the IR drop data.

* * * * *